July 30, 1957  J. J. OLIVER  2,800,793
CALORIMETERS
Filed April 28, 1955

INVENTOR.
JOSEPH J. OLIVER
BY
ATTYS.

United States Patent Office 2,800,793
Patented July 30, 1957

2,800,793
CALORIMETERS

Joseph J. Oliver, Allston, Mass., assignor, by mesne assignments, to the United States of America as represented by the Secretary of the Navy Application April 28, 1955, Serial No. 504,697

3 Claims. (Cl. 73—190)

The present invention relates to calorimeters and more particularly to a continuous flow, steady state type of calorimeter.

Various types of calorimeters are available to measure quantities of heat, and one widely used type is the continuous flow calorimeter. This type of calorimeter derives its name from the fact that a continuous stream of water enters the apparatus at an inlet, flows through a tube to cool the surrounding medium and leaves at an outlet.

To use the continuous flow calorimeter, the water is started flowing and the heat producing unit is turned on. Thermometers T1 and T2 are used to indicate the inlet and outlet temperatures and after sufficient time has elapsed, both thermometer readings become constant. When this steady state condition is reached, the heat that is carried away by the flowing water is exactly equal to that developed by the heat producing unit. If then the mass of water passing through the calorimeter during a certain time is found, the quantity of heat developed can be computed from the rise in temperature of this mass of water.

Although the continuous flow calorimeter as described above is widely used, it has many inherent disadvantages, the main disadvantages being that readings on the two thermometers should be taken frequently to determine when the steady state condition is reached and also it is difficult to get an accurate determination of the rate of coolant flow.

The present invention disclosed herein overcomes the inherent disadvantages of presently available calorimeters by eliminating both the need for coolant temperatures and coolant rate of flow. In the novel invention disclosed herein there is provided two insulated chambers that are eaach independently thermally connected to a heat sink. The heat sink is kept at a low temperature by the use of running water, however neither the temperature of the water, nor rate of flow of the water need be determined. A component which dissipates heat, the quantity being unknown, is placed in one of the two chambers and a unit that can dissipate a known quantity of heat is placed in the other chamber. Heat transfer will soon take place and there will be a flow from the two chambers to the heat sink, which is of lower temperature than the inside of the chambers. A thermocouple is connected to the two heat conducting columns that connect the chambers to the heat sink and the electromotive force induced by the different temperatures is read by a galvanometer. By regulating the known heat dissipator in the second chamber, the galvanometer can be made to null and then it will be known that the heat being dissipated in the two chambers is equal.

It is therefore, a general object of the present invention to provide an improved type of continuous flow calorimeter to determine the quantity of heat that is being dissipated by a component or unit. Other objects and many of the attendant advantages of this invention will be readily appreciated as the same becomes better understood by reference to the following detailed description when considered in connection with the accompanying drawing wherein.

Figure 1:
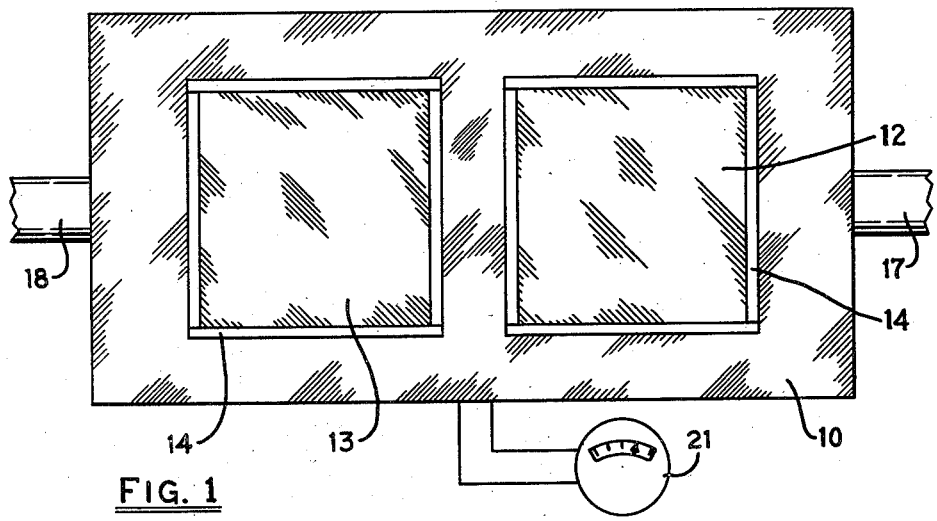
Fig. 1 is a top plan view of the invention, having the cover removed.

Referring now to the drawing, wherein like reference characters designate like or corresponding parts throughout the several views, there is shown a case 10 having a cover 11 and two chambers 12 and 13. The linings 14 of the two chambers 12 and 13 are made from a material that has good heat conducting properties, such as copper, and the case 10 and cover 11 are made from materials that have good heat insulating properties.

Figure 2:
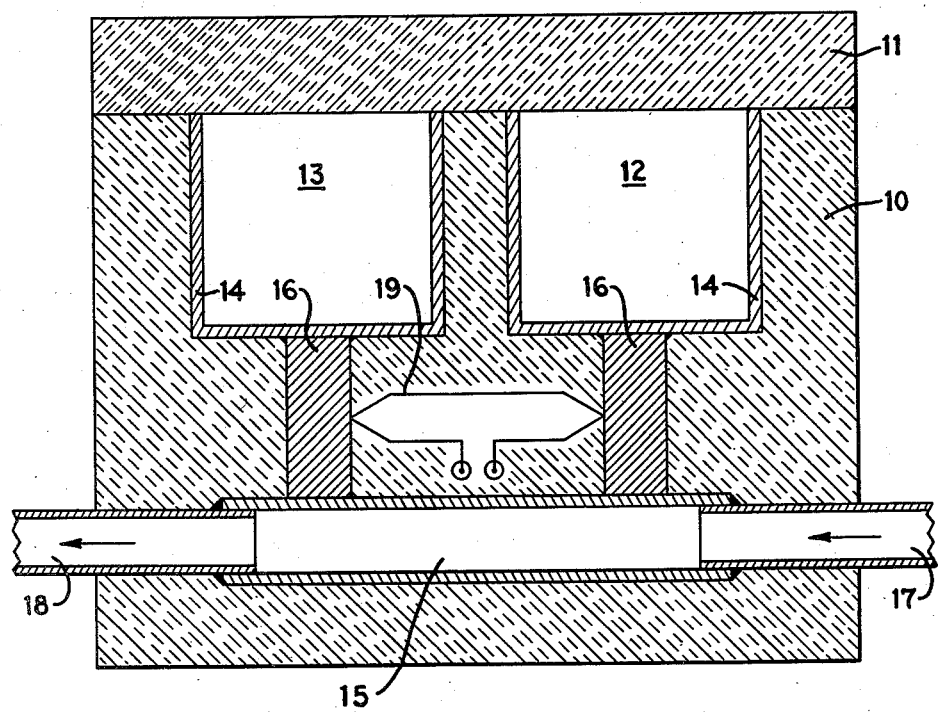
Fig. 2 is a longitudinal sectional view of the invention.

Referring particularly to Fig. 2 of the drawing there is shown a heat sink 15 that is thermally connected to chambers 12 and 13 through columns 16. The columns 16 are made from a material having good heat conducting properties, such as solid bars of copper. The heat sink 15 has an inlet pipe 17 and an outlet pipe 18 connected thereto, and a coolant, such as water, can be used to maintain the heat sink 15 at a relatively low temperature. In a more elaborate embodiment of the present invention, the heat sink could be cooled by electrical refrigeration means. The heat sink 15, as illustrated in Fig. 2, is made from circular pipe, however any configuration or shape would serve equally well.

One junction of a thermocouple 19 is connected to each column 16 and the thermocouple 19 is electrically connected to a galvanometer 21. An electromotive force exists in the circuit whenever the columns 16 are at different temperatures.

In operation, a component, such as a power supply, amplifier, or electric motor, which is to be tested for its heat disispating power, is placed in one of the two chambers, and a second heat dissipator that is capable of dissipating a known quantity of heat is placed in the other chamber. The cover 11 is closed and the heat dissipators are energized and the coolant is started flowing. After a short period of time, the inside of the chambers will reach a heat saturation point and there will be a heat flow between the chambers and the heat sink. By regulating the amount of heat being dissipated by the known heat dissipator, the amount of heat flowing in each column can be made to be equal and no electromotive force will be flowing in the thermocouple circuit, thus nulling the galvanometer.

Obviously many modifications and variations of the present invention are possible in the light of the above teaching. It is therefore to be understood that the invention may be practiced otherwise than as specifically described.

What is claimed is:

1. A calorimeter of the continuous flow, steady state type comprising; an enclosed heat insulating case having a first chamber within which a quantity of heat sought to be measured can be dissipated, a second chamber within which a known quantity of heat can be dissipated, and a third chamber; means for cooling said third chamber so that the temperature within said third chamber is substantially lower than the temperature within said first and second chambers; heat conducting columns connecting said third chamber to said first and second chambers whereby heat is caused to flow from said first and second chambers at said third chamber; and means for comparing the temperature of said heat conducting columns whereby an equality of temperature of said columns indicates an equality of heat dissipation within said first and second chambers.

2. A calorimeter as set forth in claim 1 wherein means for cooling said third chamber includes inlet and outlet pipes connected to said third chamber, said pipes and third chamber being adaptable to contain a flowing fluid.

3. A heat measuring device comprising; an enclosed case having a first chamber with good thermal conducting walls within which a quantity of heat sought to be measured can be dissipated, a second chamber with good thermal conducting walls within which a regulated quantity of heat can be dissipated, and a third chamber; means for cooling said third chamber so that the temperature within said third chamber is substantially lower than the temperature within said first and second chambers, solid metallic columns connecting said third chamber to said first and second chambers whereby heat is caused to flow from said first and second chambers to said third chamber; a thermoelectrical device connected to each metallic column for producing a potential proportional to the temperature of said column, and a galvanometer in circuit with said thermoelectrical device for indicating an equality of temperatures of said column whereby said equality indicates an equality of heat dissipation within said first and second chambers.

References Cited in the file of this patent

UNITED STATES PATENTS

| | | |
|---|---|---|
| 2,197,370 | Sullivan | Apr. 16, 1940 |
| 2,398,606 | Wang | Apr. 16, 1946 |